(12) United States Patent
Berman et al.

(10) Patent No.: US 10,270,774 B1
(45) Date of Patent: Apr. 23, 2019

(54) ELECTRONIC CREDENTIAL AND ANALYTICS INTEGRATION

(71) Applicant: MicroStrategy Incorporated, Vienna, VA (US)

(72) Inventors: Terry Berman, Vienna, VA (US); John Gehret, Washington, DC (US)

(73) Assignee: MicroStrategy Incorporated, Vienna, VA (US)

( * ) Notice: Subject to any disclaimer, the term of this patent is extended or adjusted under 35 U.S.C. 154(b) by 76 days.

(21) Appl. No.: 15/006,267

(22) Filed: Jan. 26, 2016

Related U.S. Application Data

(60) Provisional application No. 62/108,020, filed on Jan. 26, 2015.

(51) Int. Cl.
    *H04L 29/06* (2006.01)

(52) U.S. Cl.
    CPC ............ *H04L 63/10* (2013.01); *H04L 63/083* (2013.01)

(58) Field of Classification Search
    CPC .............................. H04L 63/10; H04L 63/083
    See application file for complete search history.

(56) References Cited

U.S. PATENT DOCUMENTS

| | | |
|---|---|---|
| 7,308,707 B2 | 12/2007 | Harrison et al. |
| 7,447,763 B2 | 11/2008 | Brown et al. |
| 7,536,712 B2 | 5/2009 | Kaler et al. |
| 7,852,196 B1 | 12/2010 | Adams |
| 9,251,531 B2 | 2/2016 | Sarkissian |
| 9,646,150 B2 | 5/2017 | Toth |
| 2002/0108061 A1 | 8/2002 | Harrison et al. |
| 2009/0240814 A1* | 9/2009 | Brubacher .............. H04W 8/18 709/227 |
| 2009/0249439 A1* | 10/2009 | Olden ................. H04L 63/0815 726/1 |
| 2010/0040233 A1* | 2/2010 | Ganapathy .............. H04L 63/08 380/277 |
| 2010/0043056 A1* | 2/2010 | Ganapathy ............ H04W 12/06 726/2 |
| 2010/0192212 A1* | 7/2010 | Raleigh ............ G06Q 10/06375 726/7 |
| 2010/0225580 A1* | 9/2010 | Yoon ..................... G06F 3/0304 345/157 |

(Continued)

*Primary Examiner* — Joseph P Hirl
*Assistant Examiner* — J. Brant Murphy
(74) *Attorney, Agent, or Firm* — Fish & Richardson P.C.

(57) ABSTRACT

Methods, systems, and apparatus, including computer programs encoded on a computer storage medium, for electronic credential and analytics integrations are described. In one aspect, a method includes the actions of receiving, by a restricted access system and from a client device, a request for access to the restricted access system for a user. The actions further include transmitting a request to authenticate the user. The actions further include receiving, by the restricted access system and from the credential management system, challenge data. The actions further include transmitting the challenge data. The actions further include receiving a token indicating that the credential management system authenticated the user based on the user interacting with a representation of the challenge data that was provided to the client device. The actions further include in response to receiving the token, opening a session between the client device and the restricted access system.

20 Claims, 10 Drawing Sheets

(56) References Cited

U.S. PATENT DOCUMENTS

| | | | |
|---|---|---|---|
| 2010/0275010 A1* | 10/2010 | Ghirardi | G06F 21/35 713/155 |
| 2011/0081860 A1* | 4/2011 | Brown | H04N 1/00347 455/41.3 |
| 2011/0096174 A1* | 4/2011 | King | G06F 21/31 348/207.1 |
| 2011/0285859 A1* | 11/2011 | Lin | G06F 1/1686 348/207.1 |
| 2011/0295502 A1* | 12/2011 | Faenger | H04M 1/7253 701/431 |
| 2012/0099780 A1* | 4/2012 | Smith | G06K 9/2063 382/136 |
| 2012/0102552 A1* | 4/2012 | Sammon | G06F 21/31 726/5 |
| 2012/0223883 A1* | 9/2012 | Solomon | G06F 3/0383 345/157 |
| 2012/0287290 A1* | 11/2012 | Jain | H04L 63/18 348/207.1 |
| 2012/0324553 A1* | 12/2012 | Garcia Bernardo | G06F 21/6209 726/6 |
| 2013/0086530 A1* | 4/2013 | Gandhi | G06F 3/0488 715/862 |
| 2013/0212387 A1* | 8/2013 | Oberheide | H04L 63/08 713/168 |
| 2013/0276079 A1* | 10/2013 | Foulds | H04L 63/08 726/7 |
| 2014/0159993 A1* | 6/2014 | McGie | G06F 3/1438 345/2.3 |
| 2014/0181927 A1* | 6/2014 | Sarkissian | H04L 63/08 726/6 |
| 2014/0189808 A1* | 7/2014 | Mahaffey | H04L 63/0853 726/4 |
| 2014/0337225 A1 | 11/2014 | Van Heerden et al. | |
| 2015/0058213 A1* | 2/2015 | Lee Kim-Koon | G06Q 20/3229 705/41 |
| 2015/0095999 A1* | 4/2015 | Toth | H04L 63/08 726/6 |
| 2015/0363774 A1* | 12/2015 | Priebatsch | G06Q 20/3829 705/75 |
| 2016/0094531 A1* | 3/2016 | Unnikrishnan | G06F 21/30 726/7 |

* cited by examiner

ELECTRONIC CREDENTIAL AND
ANALYTICS INTEGRATION

CROSS-REFERENCE TO RELATED
APPLICATION

This application claims the benefit of U.S. Provisional Application No. 62/108,020, filed on Jan. 26, 2015, which is incorporated by reference herein.

TECHNICAL FIELD

This disclosure relates to user authentication.

BACKGROUND

A system may authenticate a user using a username and password that the user enters. The system grants access to the user if the password corresponds to authentication data stored in connection with the user.

SUMMARY

According to an innovative aspect of the subject matter described in this application, a method for electronic credential and analytics integration includes the actions of receiving, by a restricted access system and from a client device, a request for access to the restricted access system for a user; transmitting, by the restricted access system and to a credential management system, a request to authenticate the user; receiving, by the restricted access system and from the credential management system, challenge data; transmitting, by the restricted access system and to the client device, the challenge data, the transmitted challenge data allowing the client device to output a representation of the challenge data for interaction with the user; receiving, by the restricted access system and from the credential management system, a token indicating that the credential management system authenticated the user based on the user interacting with a representation of the challenge data that was provided to the client device; and in response to receiving the token, opening, by the restricted access system, a session between the client device and the restricted access system.

These and other implementations can each optionally include one or more of the following features. The actions further include verifying, by the restricted access system, that the token is valid by providing the token to the credential management system; and receiving, by the restricted access system, verification that the token is valid. The challenge data is a QR code that the user scans with the client device running a credential management client application. The actions further include receiving, by the restricted access system and from the credential management system, data indicating that the user has an account with the credential management system. The actions further include receiving, by the restricted access system and from the credential management system, data indicating that the user does not have an account with the credential management system; and transmitting, by the restricted access system and to the client device, data indicating to prompt the user to create the account with the credential management system.

The actions further include receiving, by the restricted access system and from the credential management system, data indicating that a particular amount of time has not elapsed, wherein the challenge data expires after the particular amount of time. The actions further include poling, by the restricted access system, the credential management system, wherein receiving the token comprises receiving, in response to the polling, the credential management system. The challenge data includes two or more items selected from a group consisting of a QR code, a request for a passcode, and a request for a finger scan. The request for access is received from a web browser. The actions further include receiving, by the restricted access system and from the credential management system, data indicating that the user is located at a particular geographic location. The actions further include receiving, by the restricted access system and from the credential management system, data indicating that the a credential of the user is valid during the current time of day. The client device displays the challenge data on a screen of the client device.

Other implementations of this aspect include corresponding systems, apparatus, and computer programs recorded on computer storage devices, each configured to perform the operations of the methods.

According to another innovative aspect of the subject matter described in this application, a method for electronic credential and analytics integration includes the actions of receiving, by a restricted access system and from a system access application running on a client device, a request for access to the restricted access system for a user; transmitting, by the restricted access system and to a credential management system, a request to authenticate the user; receiving, by the restricted access system and from the credential management system, challenge data; transmitting, by the restricted access system and to the system access application, the challenge data, the transmitted challenge data allowing the system access application to transmit a representation of the challenge to a credential management client application running on the client device for transmitting to the credential management system; receiving, by the restricted access system and from the credential management system, a token indicating that the credential management system authenticated the user based on the credential management system receiving, from the credential management client application, and verifying the representation of the challenge data; and in response to receiving the token, opening, by the restricted access system, a session between the system access application on the client device and the restricted access system.

These and other implementations can each optionally include one or more of the following features. The actions further include verifying, by the restricted access system, that the token is valid by providing the token to the credential management system; and receiving, by the restricted access system, verification that the token is valid. The actions further include receiving, by the restricted access system and from the credential management system, data indicating that the user has an account with the credential management system. The actions further include receiving, by the restricted access system and from the credential management system, data indicating that the user does not have an account with the credential management system; and transmitting, by the restricted access system and to the client device, data indicating to prompt the user to create the account with the credential management system. The actions further include receiving, by the restricted access system and from the credential management system, data indicating that a particular amount of time has not elapsed, wherein the challenge data expires after the particular amount of time. The challenge data includes two or more items selected from a group consisting of a QR code, a request for a passcode, and a request for a finger scan. The actions further include receiving, by the restricted access system and from the credential management system, data indicating that the user is located at a particular geographic location. The actions further include receiving, by the restricted access system and from the credential management system, data indicating that the a credential of the user is valid during the current time of day.

Other implementations of this aspect include corresponding systems, apparatus, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Techniques are describes for integrating electronic credentials with a business intelligence, or analytics system. By integrating these two, users can access the business intelligence system without having to enter a password. As an example, a user may attempt to access a business intelligence system that performs online analytical processing (e.g., Microstragey Analytics) by logging into the system through a web client. Instead of requesting the user to enter a password to authenticate the user, the system may communicate with an electronic credential management system that is a mobile identity platform (e.g., Microstragey's Usher platform) to verify the identity of the user. The electronic credential management system manages electronic credentials for a set of users. Each electronic credential, or identity, may include information such as a user's name, position, and email address as well as the particular accesses that that user may have. Each user's electronic credential, or credential, is tied to a mobile device of the user through an electronic credential application (e.g., Usher mobile application) that is running on the mobile device. A user may open the application to view his credentials and the different accesses permitted by each credential. One of the access may include access to the business intelligence system.

Once the user attempts to log into the business intelligence system, the business intelligence system communicates with the electronic credential management system for verification of the user's identity. To verify the user's identity, the electronic credential management system sends a QR code back to the business intelligence system. The business intelligence system transmits the QR code web client for displaying on the screen to the user. The user is instructed to open the user's credential through the credential management client application running on the user's mobile device and scan the QR code with the user's mobile device. With the credential management client application open, the mobile device transmits the QR code back to the electronic credential management system. If the electronic credential management system receives a QR code that corresponds to the QR code that the electronic credential management system sent to the business intelligence system, then the electronic credential management system authenticates the user. The electronic credential management system then sends data to the business intelligence system indicating that the user's credential is valid and authorizes access to the business intelligence system. The business intelligence system then opens a session with the web client.

Figure 1:
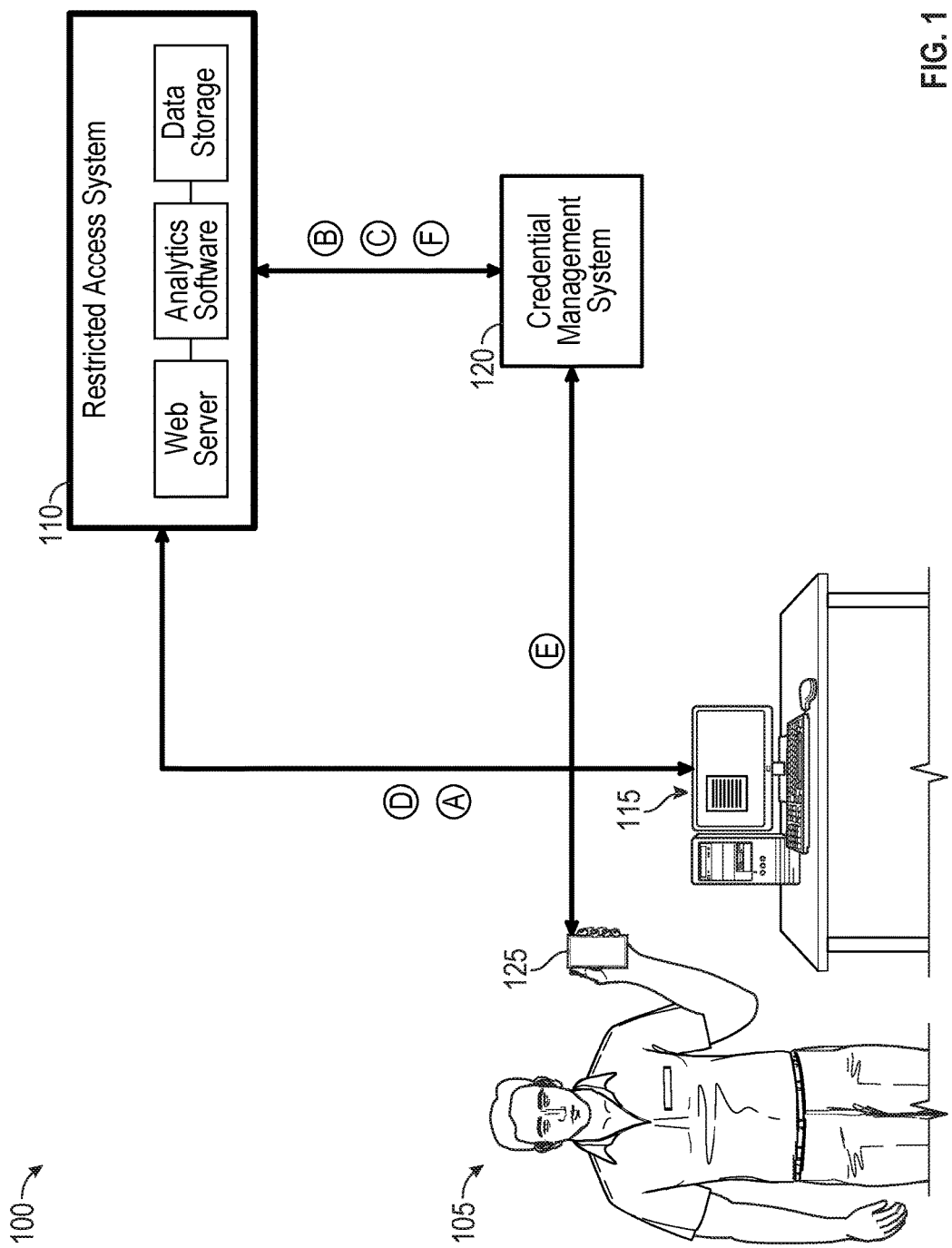
FIG. 1 illustrates an example system for authenticating a user who is accessing a system through a web interface.

FIG. 1 illustrates an example system for authenticating a user who is accessing a system through a web interface. In the example shown in FIG. 1, user 105 is attempting to access the restricted access system 110 through client 115. The restricted access system may be a computing device or a network of computing devices that allows access to authenticated users. The restricted access system may authenticate users using a username and password, or receive data from another device, such as the credential management system 120, that identifies the user attempting to log into the system as authenticated. The restricted access system 110 may include a web server that runs an application that provides an interface for users of a web client to login to the system 110. The restricted access system 110 may also include analytics software, also known as a business intelligence system (e.g., Microstrategy Analytics). The analytics software provides a metadata layer between the data storage and the web server. The data storage may be located locally or remotely with respect to the analytics software. The analytics software may categorize and identify the data in the data storage. The data storage may include tables, spreadsheets, charts, graphs, documents, lists, and any other type of data. The metadata layer allows the analytics software to translate plain language requests to queries to the data storage. For example, a user may request data related to sales from 2014. The metadata may include data related to sales for different regions such as north and south regions. A user may choose to analyze the south region and the metadata may include data related to sales for specific stored in the south region. A user may choose to analyze profits from each store in the south region.

To access the restricted access system 110, the user may be required to log into the analytics software through a web interface that is running on a web client. To begin the login process and in stage "A," the user 105, through client 115, accesses a login screen of the restricted access system. The user 105 may access the login screen through the web interface running in a browser running on the client 115 or through a desktop application running on client 115. The user 105 enters a user identifier in to the client 115. The user identifier may be an email address, username, or other similar unique identifier. The restricted access system 110 receives the user identifier and initiates the authentication process.

In stage "B," the restricted access system 110 provides the user identifier to the credential management system 120. The credential management system 120 is an identity management system that manages credentials that a credential granting authority has issued to users. The users may use the credentials to access resources of the credential granting authority. The user may access and view the user's credentials through a credential management client application that is running on a mobile device such as mobile device 125. As an example, the credential granting authority may be a company that issues credentials to its employees. The credentials may include keys to unlock doors of the company's building, access the company's Wi-Fi network, access a particular file system on the company's file system, and/or any other resources at the company whose access is controlled using credentials.

The credential management system 120 receives the user identifier and compares the user identifier to a list of user identifiers that have an account with the credential management system. In some implementations, the credential management system 120 determines that the user identifier does not have an account with the credential management system 120. In this instance, the credential management system 120 may provide the information to the restricted access system 110 for the restricted access system 110 to instruct the user 105 to install the credential management client application on the mobile device 125 and create an account on the credential management system 120.

Once the credential management system 120 has confirmed that the user 120 has an account with the credential management system 120, at stage "C," the credential management system 120 provides challenge data to the restricted access system 110. The challenge data may be a QR code for the user to scan using the mobile device 125, a pass code for the user enter into the mobile device 125, a question for the user to answer by entering the answer in the mobile device 125, or instructions for the user to perform a particular operation on the mobile device 125. In other implementations, the challenge data may be audible data that the user responds to by entering a response into the mobile device 125. In some implementations, the user may respond the challenge data by speaking so the user's identity is verified by voice identification and/or by the content of the speech. In some implementations, the challenge data may be an infrared or radio signal that the client emits and is received by the mobile device 125. The client 115 may respond through infrared or radio communication. In some implementations, the challenge data may request the use to write something on the screen of the client 115 so that the user's handwriting may be verified.

In some implementations, the credential management system 120 may not determine whether the user identifier is associated with an account on the credential management system 120. For example, the restricted access system 110 may receive the user identifier "userA" and request challenge data from the credential management system 120. The credential management system may not receive the user identifier and may just provide the restricted access system 110 with the challenge data.

At stage "D," the restricted access system 110 provides the challenge data to the client 115. The client 115 presents the challenge data on a display for the user 105 to view. For example, the client 115 may display the QR code on the display and/or an instruction for the user to perform. The instructions may be for the user to open the credential management client application on the mobile device 125 and scan the QR code.

In some implementations, the challenge data has an expiration time. If the user does not interact with the challenge data before the expiration time has elapsed, then the restricted access system 110 denies access to the user. For example, the restricted access system 110 may display a QR code on the client 115 and give the user one minute to scan the code with the mobile device 115. If the restricted access system 110 does not receive an indication from the credential management system 120 that the user has scanned the QR code, then the restricted access system 120 denies the user access. If the expiration time has elapsed, then the restricted access system 120 may request new challenge data from the credential management system 120.

In stage "E," the user accesses the credential management client application that is running on the mobile device 115 and uses the application to interact with the challenge data. For example, the user 105 may scan a QR code using the credential management client application running on the mobile device 115. Once the user interacts with the challenge data, the mobile device 125 provides the interaction data to the credential management system 120.

The credential management system 120 receives the interaction data and compares it to the challenge data. If the credential management system 120 determines that interaction data corresponds to the challenge data, then the credential management system 120, at stage "F," provides data to the restricted access system 110 indicating that the user's identity is verified. The data may include a security token. If the credential management system 120 determines that the interaction data does not correspond the challenge data, then the credential management system 120 provides data to the restricted access system 110 indicating that the user's identity is not verified.

In some implementations, the credential management system 120 provides data to the restricted access system 110 indicating that the user has interacted with the challenge data. In some implementations, the restricted access system 110 polls the credential management system 120 to determine if the user has interacted with the challenge data. If the credential management system 120 reaches a determination as to whether the user's 105 identity is valid, then once the restricted access system 110 polls the credential management system 120, the credential management system 120 provides the restricted access system with a determination of the user's 105 identity.

In some implementations, the user 105 does not provide a user identifier to the restricted access system 110 at the beginning of the login process. The user 105 may access the restricted access system 110 on the client 115 and upon detecting that a user is interacting with the restricted access system 110, the restricted access system 110 requests challenge data from the credential management system 120. The restricted access 110 receives the challenge data from the credential management system 120 and provides the challenge data to the client 115. The client 115 may instruct the user to interact with the challenge data with the credential management client application on the mobile device 125. If the user 105 does not have the credential management client application on the mobile device 125 or have an account with the credential management system 120, then the client 115 may instruct the user to perform one or both of the actions. Once the user interacts with the challenge data using mobile device 125, the credential management system 120 receives the interaction data in connection with the user's 105 account in the credential management system 120. The credential management system 120 determines the validity of the interaction data based on a comparison with the challenge data and provides the identity of the user 105 to the restricted access system 110.

Once the restricted access system 110 has received confirmation from the credential management system 120 that the identity of the user 105 is verified, the restricted access system 110 grants access to the user 105 if the restricted access system 110 determines that the user 105 is an authorized user by opening a session. To do so, the web interface for the restricted access system 110 that the user has interacted with through the client 115 passes the user identifier, or similar user identifying data, and the security token to the underlying data storage system of the restricted access system 110. The data storage system transmits the user identifier and the security to the credential management system 120 through the API of the credential management system 120. The credential management system 120 determines the validity of the user identifier and security token. If the credential management system 120 provides data confirming that the user identifier and security token are valid, then the data storage system allows the user to access its data through the web interface. In some implementations, the session is a secure session, a time-limited session, and/or a session that only allows restricted functions to be preformed such as those functions specified by the user's credential.

Figure 2:
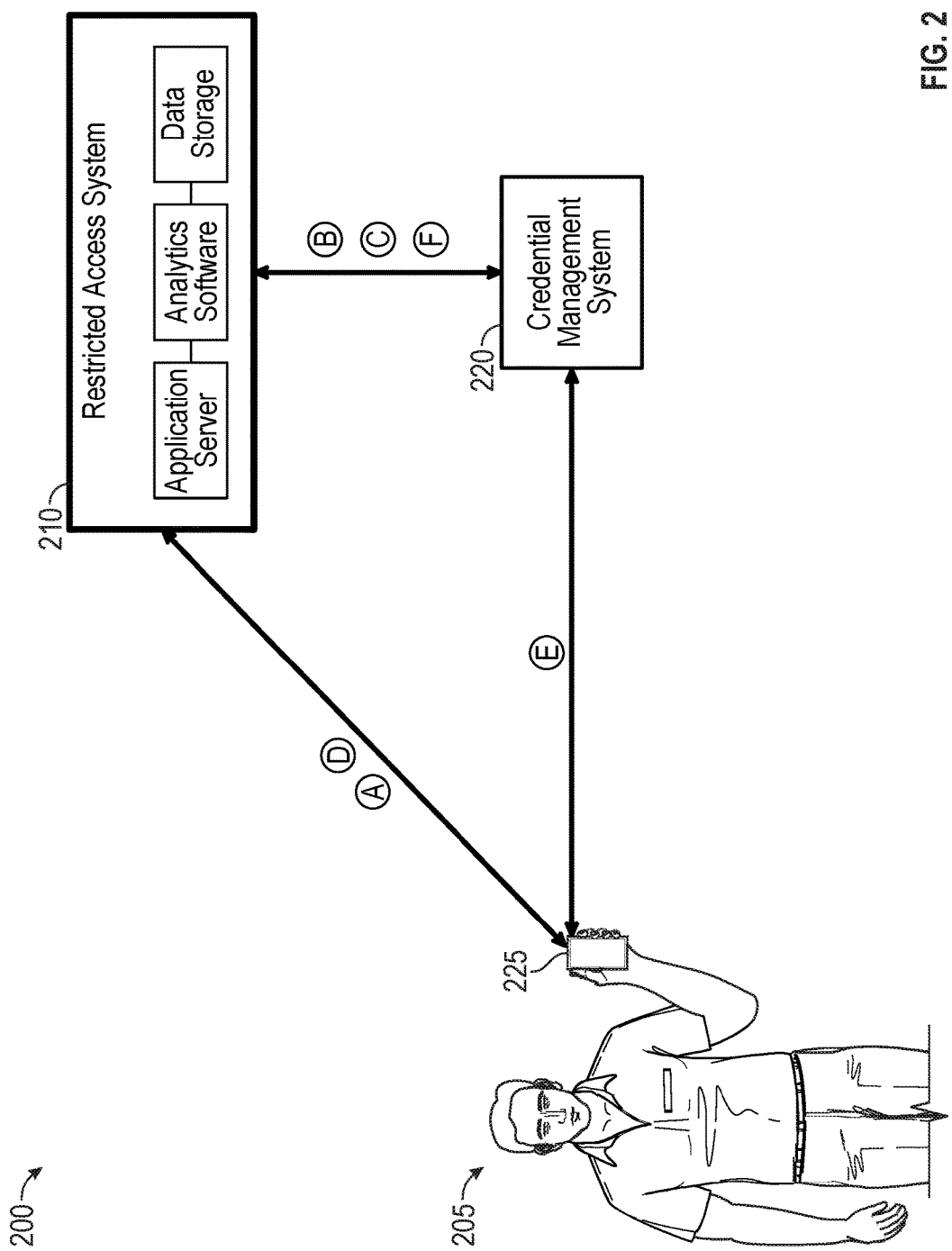
FIG. 2 illustrates an example system for authenticating a user who is accessing a system through a mobile application interface.

FIG. 2 illustrates an example system 200 for authenticating a user 205 who is accessing a system through a mobile application interface. In the example shown in FIG. 2, user 205 is attempting to access a restricted access system 210 through mobile device 225. The restricted access system 210 is similar to the restricted access system 110 from FIG. 1. Instead of a web server, the restricted access system 210 includes an application server. Running on the application server is a mobile interface application that is configured to interface with an analytics application running on a computing device such as mobile device 225. The analysis application is an application that is configured to receive data requests from a user and receive data that the analytics software retrieves form the data storage. The analytics application may provide similar functionality to the web client on client 115. The restricted access system 210 may be a computing device or a network of computing devices that allows access to authenticated users. The restricted access system 210 may authenticate users using a username and password, or receive data from another device, such as the credential management system 220, identifying the user attempting to log into the system as authenticated. The restricted access system 210 may also include analytics software. The analytics software provides a metadata layer between the data storage and the application server. The data storage may be located locally or remotely with respect to the analytics software. The analytics software may categorize and identify the data in the data storage. The data storage may include tables, spreadsheets, charts, graphs, documents, lists, and any other type of data. The metadata layer allows the analytics software to translate plain language requests to queries to the data storage. For example, a user may request data related to sales from 2014. The data storage may contain tables, graphs, and charts related to sales, revenue, profits, costs of goods sold, or similar labels. The metadata layer allows the analytics software to identify and retrieve the relevant data to sales from 2014 in response to the user request.

To begin the login process and in stage "A," the user opens the analytics application on the mobile device 225 and the analytics application connects with the application server of the restricted access system 210. The analytics application indicates to the user that the restricted access system 210 requires the user to login. At stage "B," the application server of the restricted access system 210 connects to the credential management system 220. The application server indicates to the credential management system 220 that a user is attempting to access the restricted access system 210 through the application server. In some implementations, the analytics application provides data to identify the user to the application server of the restricted access system 210. In some implementations, the application server provides the data identifying the user to the credential management system 220.

At stage "C," the credential management system 220 provides challenge data and secret data to the application server of the restricted access system 210. The challenge data may include a QR code or other unique data. The secret data may include a key or other string of characters or bits. In some implementations, the credential management system 220 generates a new QR code and new unique data each time the restricted access system 210 indicates that a user is attempting to login. In some implementations, the QR code may be linked to a particular user and the credential management system 220 provides the same QR code when the application server of the restricted access system 210 provides the identity of the user 205. In this instance, the credential management system 220 may still generate a new unique data for each login attempt.

At stage "D," the application server of the restricted access system 210 provides the challenge data to the analytics application running on the mobile device 225. Upon receiving the challenge data, the analytics application initiates an application switch on the mobile device 225 and passes the challenge data to a credential management client application. For example, the analytics application receives a QR code. When the analytics application receives the QR code, the analytics application opens the credential management client application and provides the QR code to the credential management client application. The mobile device may display the QR code on the screen, but it may not be necessary for the user 205 to scan the QR code.

In some implementations, the mobile device 225 may not include the credential management client application. In this instance, when the analytics application receives a QR code form the application server, the analytics application may determine that the credential management client application is not installed on the mobile device 225. The analytics application may request that the user 205 install the analytics application on the mobile device 225 so that the analytics application can pass the challenge data to the credential management client application.

At stage "E," the credential management client application provides the challenge data to the credential management system 220. Before providing the challenge data to the credential management system 220, the credential management client application may provide data identifying the user 205 to the credential management system 220. In some implementations, the credential management system 220 may authenticate the user 205 and then receive the challenge data from the credential management client application. In this instance, verifying the challenge data provides the credential management system 220 assurance that the credential management system 220 should authenticate the user 225 to the restricted access system 210.

At state "F," the credential management system 220 provides an access token to application server of the restricted access system 210. In some implementations, the application server may poll the credential management system 220 for information regarding the authentication of the user 205. In some implementations, the credential management system 220 may provide the access token once the credential management system 220 has authenticated the user 205 without the application server requesting the access token.

Once the application server receives the access token from the credential management system 220, the application server opens a session between the application server and the data storage system. The application server may open the session by making a CreateSession call to the data storage system. Once the session is open between the application server and the data storage system, the data storage system retrieves information related to the user 205 from the credential management system 220 using the access token. The credential management system 220 provides data to the data storage system that the user's 205 identity is confirmed, and the data storage system opens the session between the data storage system and the application running on the mobile device 225. In some implementations, the session is a secure session, a time-limited session, and/or a session that only allows restricted functions to be preformed such as those functions specified by the user's credential.

Figure 3:
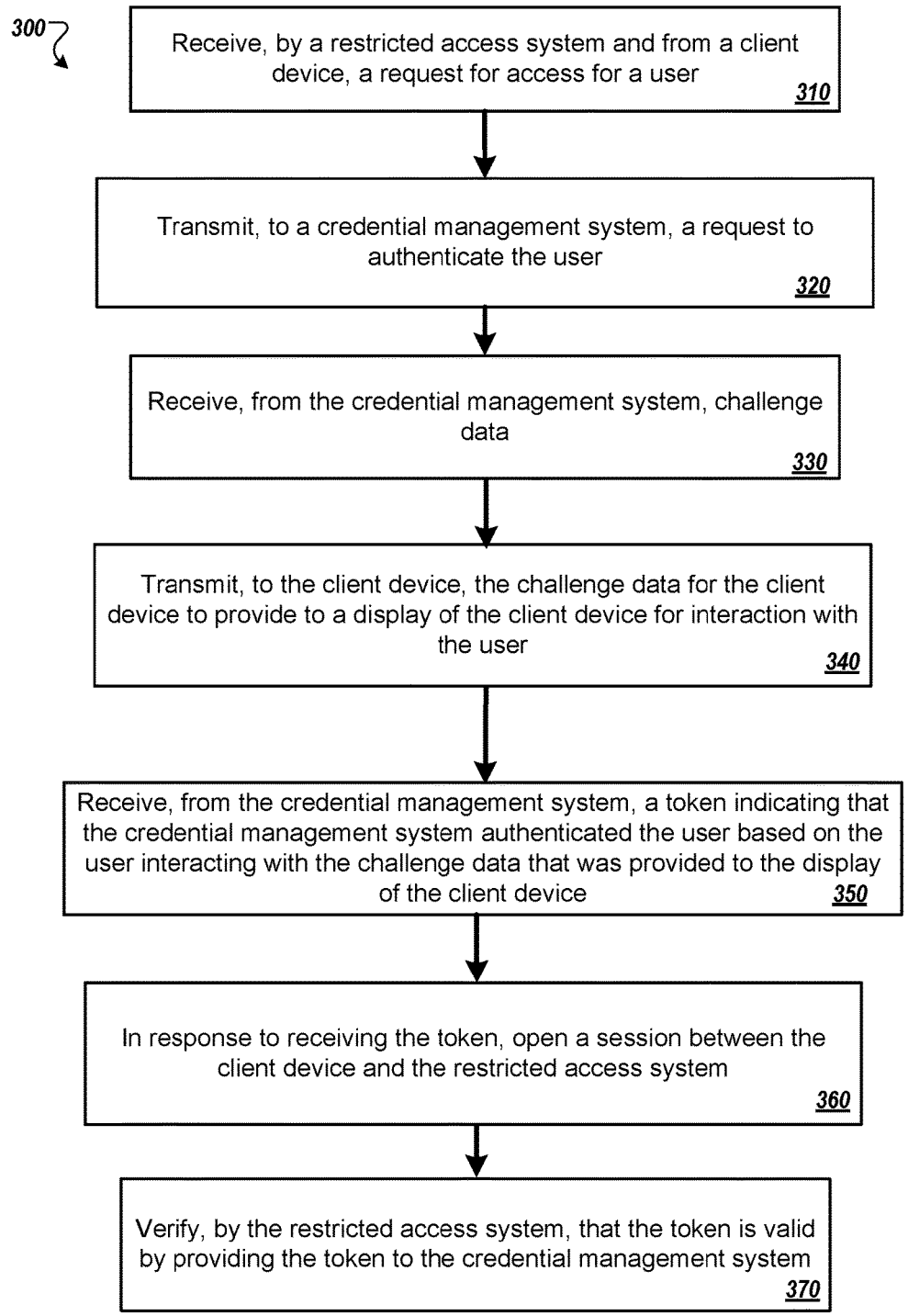
FIG. 3 is a flowchart of an example process for authenticating a user who is accessing a system through a web interface.

FIG. 3 is a flowchart of an example process 300 for authenticating a user who is accessing a system through a web interface. The operations of the process 300 are described generally as being performed by the restricted access system 110, specifically by an application running on the web server of the restricted access system 110. The operations of the process 300 may be performed by one of the other components of the system shown in FIG. 1 or may be performed by a combination of the components of the system shown in FIG. 1. In some implementations, operations of the process 300 may be performed by one or more processors included in one or more electronic devices.

The restricted access system 110 receives, from a client device, a request for access for a user (310). The user attempts to access the system through the web interface that is displayed in a browser of the client device. The client device may be any type of computing device with a browser such as a desktop computer, a laptop computer, a tablet, a mobile phone, or any similar computing device. In addition to the web interface, the system includes a data storage system. The data storage system may be accessed locally or remotely by the system. Analytics software may be located logically between the web interface and the data storage system. The analytics software allows the user to query the data storage system through the web interface and view data stored in the data storage system.

The restricted access system 110 transmits, to a credential management system, a request to authenticate the user (320). In some implementations, the system 110 receives, from the client device, a user identifier. In this instance, the system 110 may provide the user identifier to the credential management system. In some implementations, the system 110 may not receive a user identifier. In this instance, and even if the system 110 receives the client identifier, the system may only request that the credential management system authenticate the user. In some implementations, the system 110 may transmit a request to the credential management system to user a particular authentication scheme. For example, the authentication scheme may involve two factor authentication, biometric identification, passcode authentication, determining geographic location of the user, or a combination of these.

The restricted access system 110 receives, from the credential management system, challenge data (330). The challenge data may be a QR code, an instruction for the user to perform an action such as scan a finger, a question for the user to answer, a prompt for a password, or any combination of these. For example, the system 110 may have requested two factor authentication, and so the challenge data may be a QR code and a request for the user to enter a code from a hardware token. As another example, the challenge data may be a QR code and a request to enter a code that is presented to the user. In some implementations, the credential management system may store information related to a user's ability to perform particular authentication schemes. For example, if the credential management system has information that the user does not have a hardware token, then the credential management system may select a different authentication scheme. In some implementations, the credential management system may have received a user identifier. In this instance, the credential management system may check to determine if the user has an account with the credential management system. If the user does have an account with the credential management system, then the credential management system may proceed to provide the challenge data to the system 110. If the user does not have an account, then the credential management system may proceed to notify the system 110 to instruct the user to create an account with the credential management system. In some implementations, the credential management system may add an expiration time to the challenge data. If the credential management system does not receive a response based on the challenge data before the expiration time elapses, then the credential management system may not authenticate the user. Once the expiration time elapses, the credential management system may issue new challenge data or may do so at the request of the system 110.

The restricted access system system 110 transmits, to the client device, the challenge data for the client device to provide to a display of the client device for interaction with the user (340). The system, through the web interface, transmits the challenge data along with instructions for the user. The instructions may be for the user to open the credential management client application on the user's mobile device and scan the QR code displayed and enter the passcode displayed on the screen. Alternatively, the instructions may be for the user to answer a challenge question, scan the QR code, and scan the user's fingerprint on the mobile device's fingerprint scanner. The credential management client application provides the interaction data to the credential management system, and the credential management system verifies that the interaction corresponds to the challenge data. The credential management client application may also provide the identity and location of the user to the credential management system.

The restricted access system system 110 receives, from the credential management system, a token indicating that the credential management system authenticated the user based on the user interacting with the challenge data that was provided to the display of the client device (350). In some implementations, the system 110 may also receive the geographic location and identity of the user. With regards to geographic location, particular credentials may have geographic limitations tied to them. For example, a user's credential may not be valid if the user is outside of a particular geofence. In this case, the credential management client application may provide information that the user's identity has been verified, but that the user is outside of the permitted geofence. There may be instances where the system 110 only needs to authenticate the user and may not be concerned that the user is outside the permitted geofence. In other instances, the system 110 may require that the user requires a valid credential to access the data and the credential is not valid if the user is outside the user's geofence. In some implementations, the system 110 polls, at periodic intervals, the credential management system for a token. In other implementations, the credential management system provides a token to the system 110 upon authenticating the user. In some implementations, the user's credentials may indicate the portion of the restricted access system that the user can access. For example, the user's credentials may indicate that the user can access data from only a particular year. In this instance, the credential management system may provide the access permissions for the user to the system 110. In some implementations, the user's credentials may include temporal restrictions. For example, the user's credentials may only be valid from 9 am to 5 pm, Monday through Friday. The credential management system may indicate to the system 110 that the credentials are invalid if the user attempts to access the system 110 outside the valid times. The system 110 may then make a determination whether to grant access to the user based on the validity of the credentials or only based on the system 110 verifying the identity of the user.

The restricted access system system 110, in response to receiving the token, opens a session between the client device and the restricted access system (360). The session may be through the web interface system 110 and connect to the restricted access system through the analytics software. Once the session is open, the system 110, verifies that the token is valid by providing the token to the credential management system (370).

Figure 4:
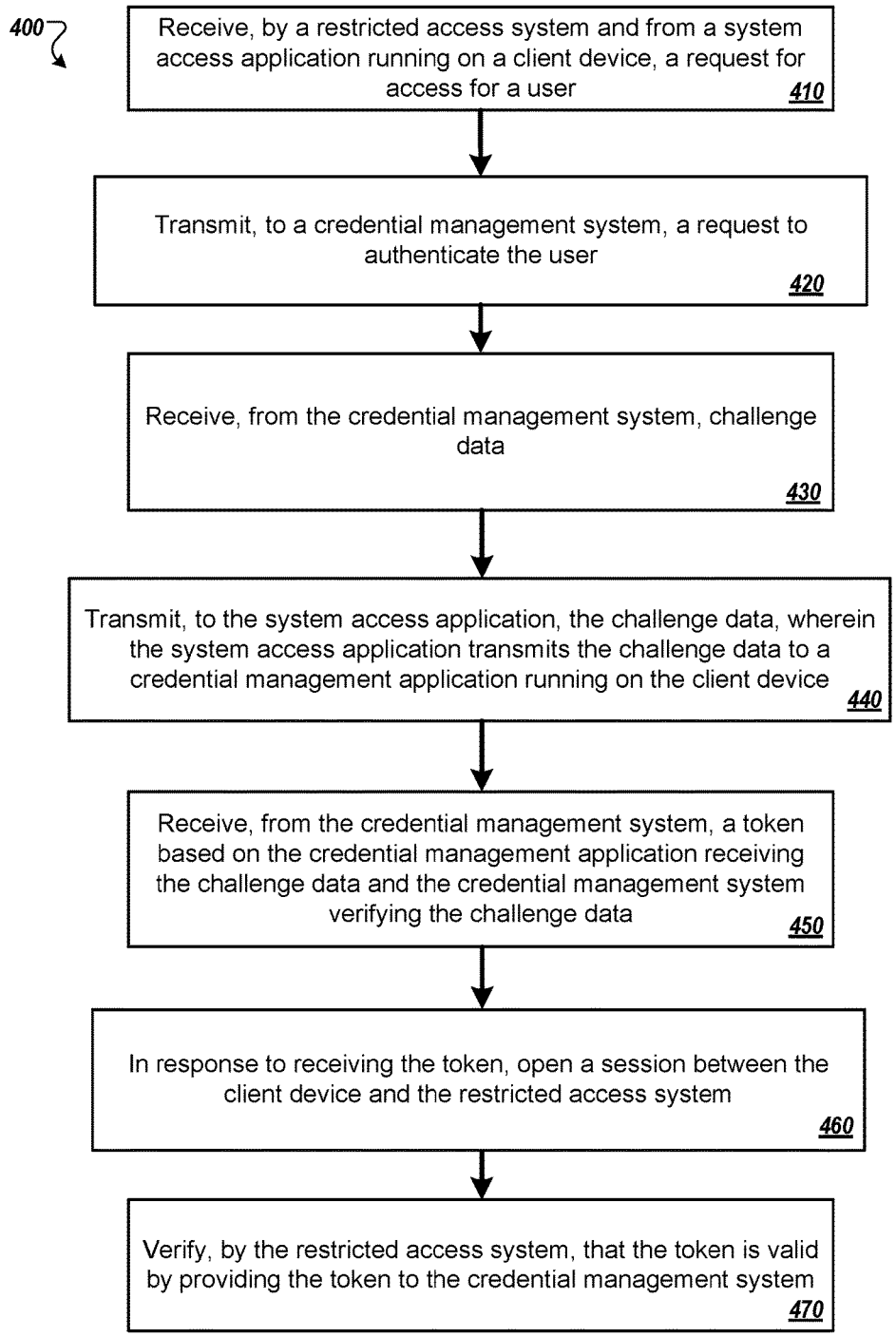
FIG. 4 is a flowchart of an example process for authenticating a user who is accessing a system through a mobile application interface.
Figure 5:
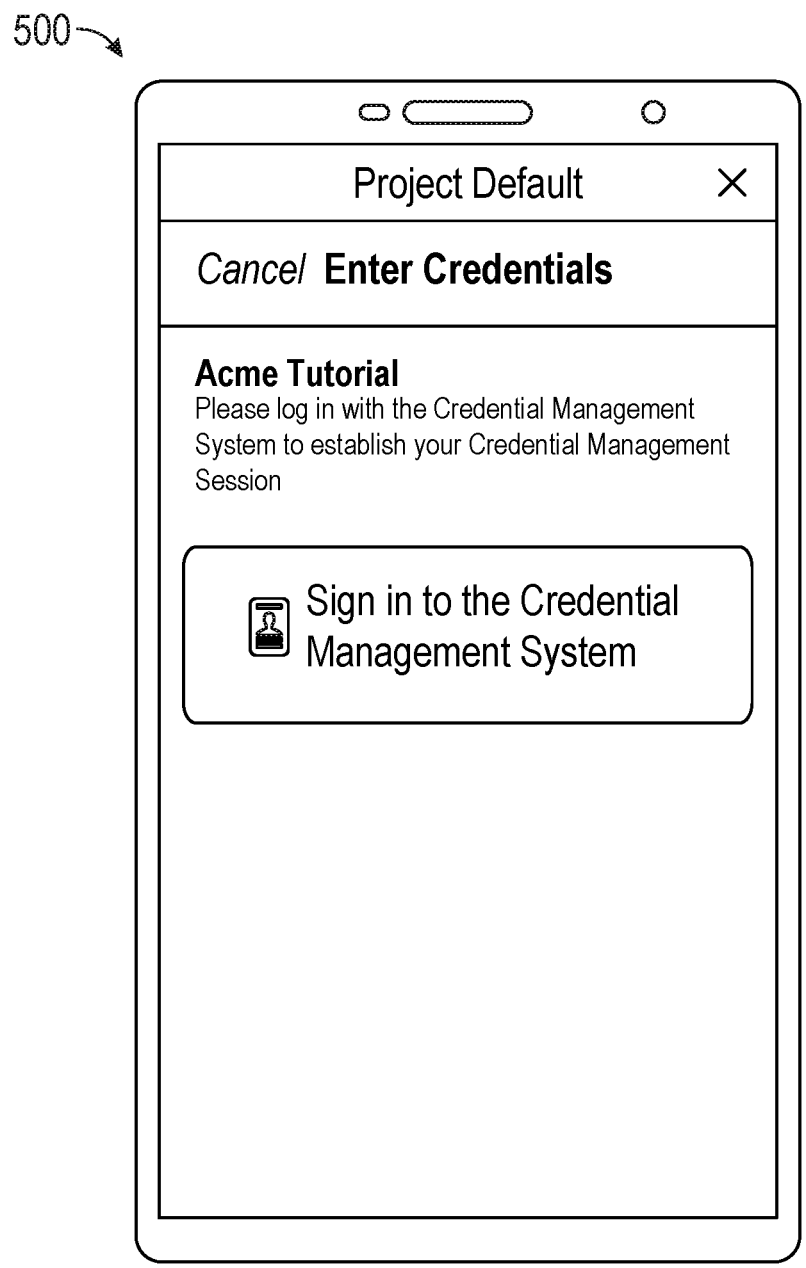
FIGS. 5-8 are diagrams illustrating example user interfaces for authenticating a user who is accessing a system through a mobile application interface.
Figure 6:
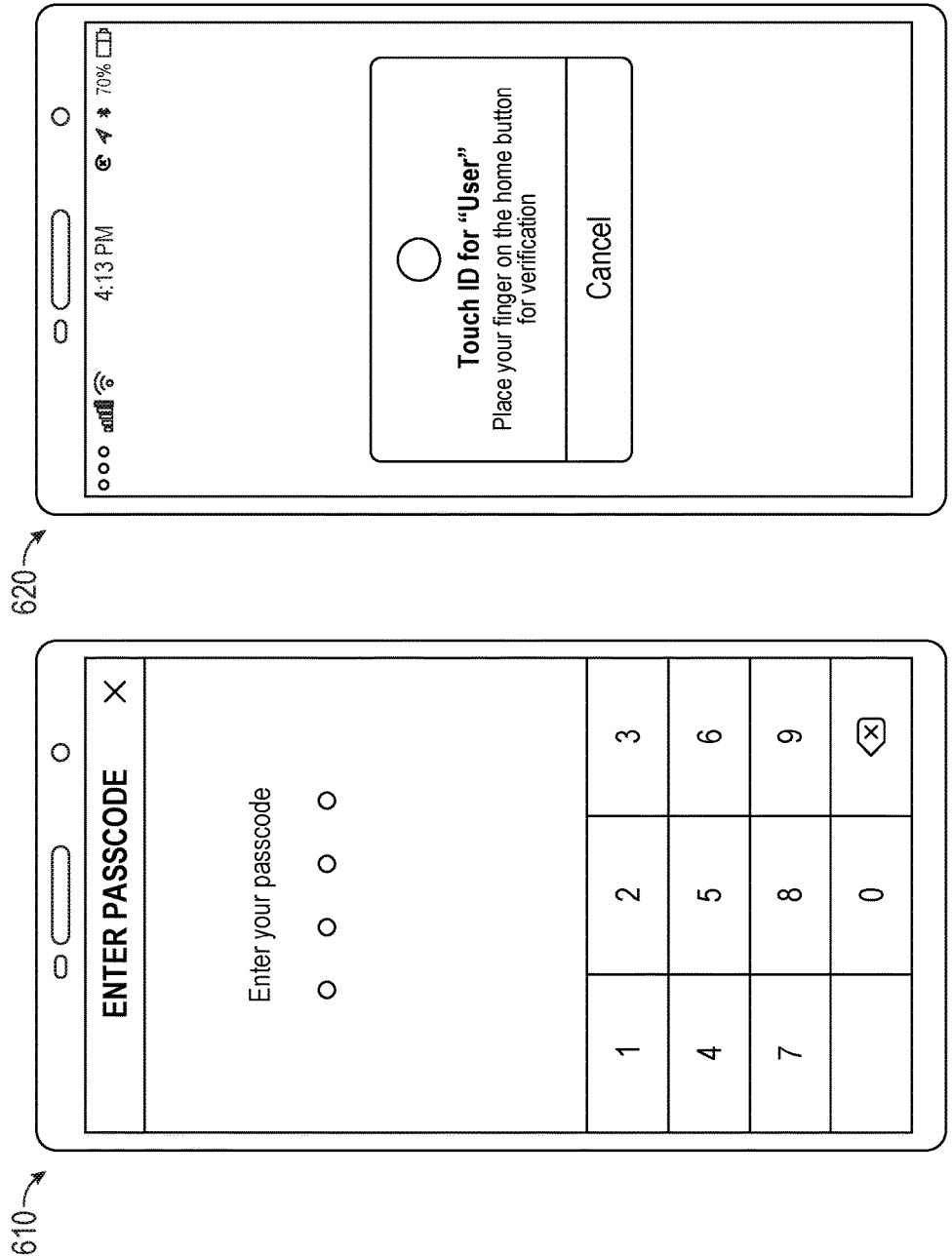
Figure 7:
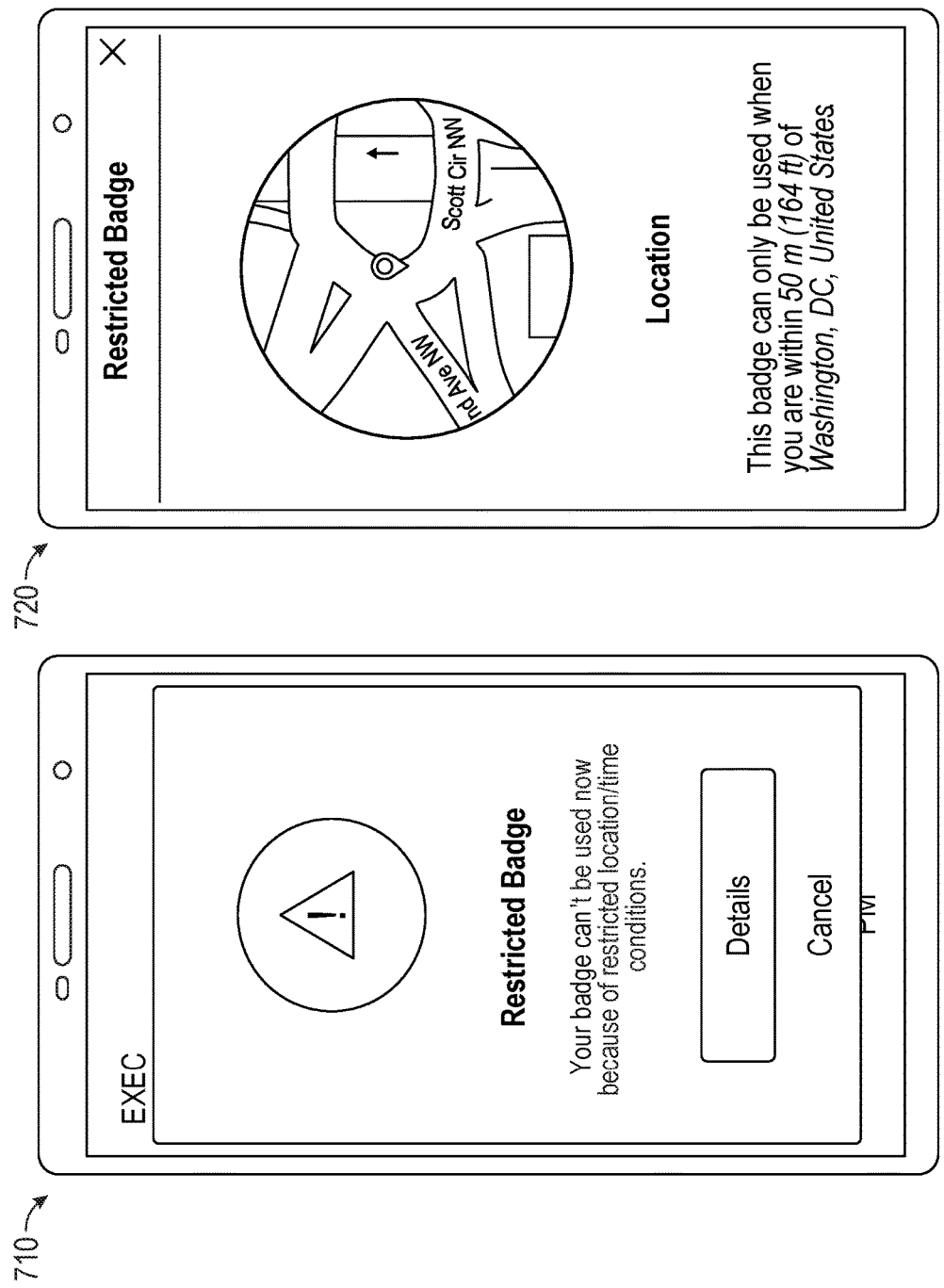
Figure 8:
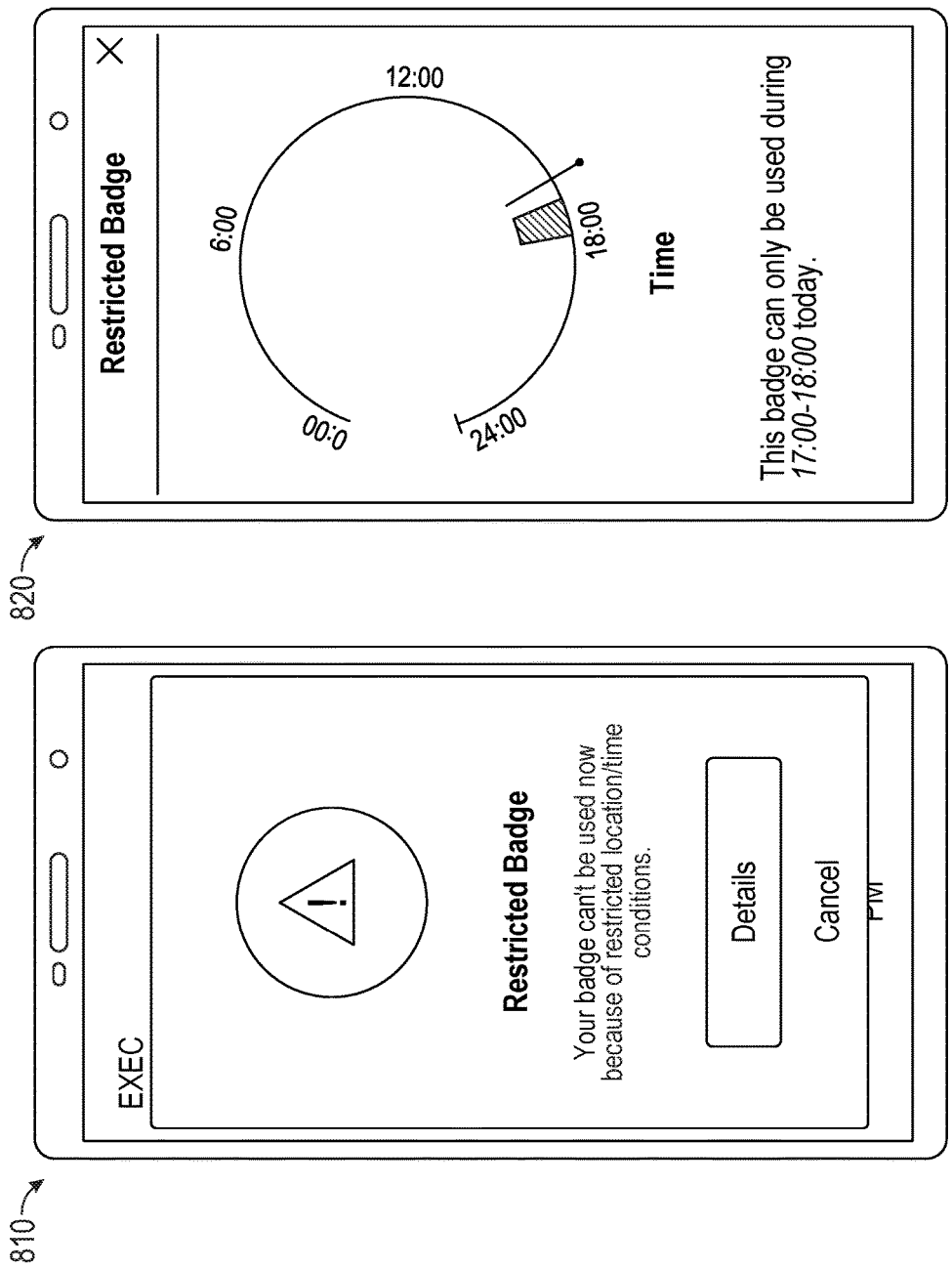

FIG. 4 is a flowchart of an example process 400 for authenticating a user who is accessing a system through a mobile application interface. The operations of the process 400 are described generally as being performed by the restricted access system 210, specifically the mobile interface application running on the restricted access system 210. The operations of the process 400 may be performed by one of the other components of the system shown in FIG. 2 or may be performed by a combination of the components of the system shown in FIG. 2. In some implementations, operations of the process 400 may be performed by one or more processors included in one or more electronic devices.

The restricted access system 210 receives, from a system access application running on a client device, a request for access for a user (410). The user attempts to access the system through the system access application that has been installed on the client device. The client device may be any type of computing device that can run the system access application such as a desktop computer, a laptop computer, a tablet, a mobile phone, or any similar computing device. The system includes an application server and data storage system. The application server interfaces with the system access application. The data storage system may be accessed locally or remotely by the system. Located logically between the application server and the data storage system may be analytics software. The analytics software allows the user to query the data storage system through the system access application and formulates the queries so that the data storage system can execute them.

The restricted access system 210 transmits, to a credential management system, a request to authenticate the user (420). In some implementations, the system 210 receives, from the client device, a user identifier. In this instance, the system 210 may provide the user identifier to the credential management system. In some implementations, the system 110 may not receive a user identifier. In this instance, and even if the system 110 receives the user identifier, the system may only request that the credential management system authenticate the user. In some implementations, the system 110 may transmit a request to the credential management system to use a particular authentication scheme. For example, the authentication scheme may involve two factor authentication, biometric identification, passcode authentication, determining geographic location of the user, or a combination of these.

The restricted access system 210 receives, from the credential management system, challenge data (430). The challenge data may be a QR code, an instruction for the user to perform an action such as scan a finger, a question for the user to answer, a prompt for a password, or any combination of these. For example, the system 210 may have requested two factor authentication and the challenge data may be a QR code and a request for the user to enter a code from a hardware token. As another example, the challenge data may be a QR code and a request to enter a code that is presented to the user. In some implementations, the credential management system may store information related to a user's ability to perform particular authentication schemes. For example, if the credential management system has information that the user does not have a hardware token, then the credential management system may select a different authentication scheme. In some implementations, the credential management system may have received a user identifier. In this instance, the credential management system may check to determine if the user has an account with the credential management system. If the user does have an account with the credential management system, then the credential management system may proceed to provide the challenge data to the system 210. If the user does not have an account, then the credential management system may proceed to notify the system 210 to instruct the user to create an account with the credential management system. In some implementations, the credential management system may add an expiration time to the challenge data. If the credential management system does not receive a response based on the challenge data before the expiration time elapses, then the credential management system may not authenticate the user. Once the expiration time elapses, the credential management system may issue new challenge data or may do so at the request of the system 210. In some implementations, the client device may provide data to the system 210 indicating the capabilities of the client device that may be used for user authentication. For example, the client device may indicate to the system 210 that the client device includes a fingerprint scanner and a retina scanner.

The restricted access system 210 transmits, to the system access application, the challenge data, wherein the system access application transmits the challenge data to a credential management client application running on the client device (440). The system, through the application server, transmits the challenge data along with instructions for the user. The instructions may be for the user to perform some type of two factor authentication such as entering a code from a hardware token. Alternatively, the instructions may be for the user to answer a challenge question, and scan the user's fingerprint on the client device's fingerprint scanner. When the system access application receives the challenge data, the system access application initiates an application switch between the system access application and the credential management client application. The system access application transmits the challenge data to the credential management client application. The credential management client application provides the challenge data to the credential management system and prompts the user for any additional input such as input related to two factor authentication. The credential management client application also provides the additional input to the credential management system. The credential management system verifies the challenge data and the additional input to authenticate the user. The credential management client application may also provide the identity and location of the user to the credential management system.

The restricted access system 210 receives, from the credential management system, a token based on the credential management client application receiving the challenge data and the credential management system verifying the challenge data (450). In some implementations, the system 210 may also receive the geographic location and identity of the user. With regards to geographic location, particular credentials may have geographic limitations tied to them. For example, a user's credential may not be valid if the user is outside of a particular geofence, e.g., a defined geographical area. To determine the location of a user, the system 210 or the client device, may use GPS, location beacons transmitted or received form the client device or the system 210, or another similar location mechanism. The credential management client application may provide information that the user's identity has been verified, but that the user is outside of the permitted geofence. There may be instances where the system 210 only needs to authenticate the user and may not be concerned that the user is outside the permitted geofence. In other instances, the system 210 may require that the user requires a valid credential to access the data and the credential is not valid if the user is outside the user's geofence. In some implementations, the system 210 polls, at periodic intervals, the credential management system for a token. In other implementations, the credential management system provides a token to the system 210 upon authenticating the user. In some implementations, the user's credentials may indicate the portion of the restricted access system that the user can access. For example, the user's credentials may indicate that the user can access data from only a particular year. In this instance, the credential management system may provide the access permissions for the user to the system 210. In some implementations, the user's credentials may include temporal restrictions. For example, the user's credentials may only be valid from 9 am to 5 pm, Monday through Friday. The credential management system may indicate to the system 210 that the credentials are invalid if the user attempts to access the system 210 outside the valid times. The system 210 may then make a determination whether to grant access to the user based on the validity of the credentials or only based on the system 210 verifying the identity of the user.

The restricted access system 210, in response to receiving the token, opens a session between the client device and the restricted access system (460). The system 210 verifies that the token is valid by providing the token to the credential management system (470).

FIGS. 5-8 are diagrams illustrating example user interfaces for authenticating a user who is accessing a system through a mobile application interface. User interface 500 illustrates an example interface for a data access application that is running on a computing device such as a mobile phone. The user interface 500 includes a selectable option for the user to authenticate himself to the data access system through the credential management system. User interfaces 610 and 620 illustrate example two factor authentication options for granting access to the data access system through the data access application. User interface 610 prompts the user to enter a passcode. The passcode may be specific to the data access system or to the mobile device. User interface 620 prompts the user to scan the user's finger. The mobile device may provide data to the data access application that the fingerprint matches a particular user's fingerprint.

User interfaces 710 and 720 illustrate example user interfaces for a rejected credential. In instances where a user's credential is invalid because the user is outside of a geofence, the mobile device may display the interface 710 indicating that the user's credential is not valid because of the user's location. The user may select a button for additional details, and the mobile device may display user interface 720 indicating the geographical restrictions for the user's credential.

User interfaces 810 and 820 illustrate example user interfaces for a rejected credential. In instances where a user's credential is invalid because the user is outside particular time of day where the credential is valid, the mobile device may display the interface 810 indicating that the user's credential is not valid because of the time of day. The user may select a button for additional details, and the mobile device may display user interface 820 indicating the temporal restrictions for the user's credential.

Figure 9:
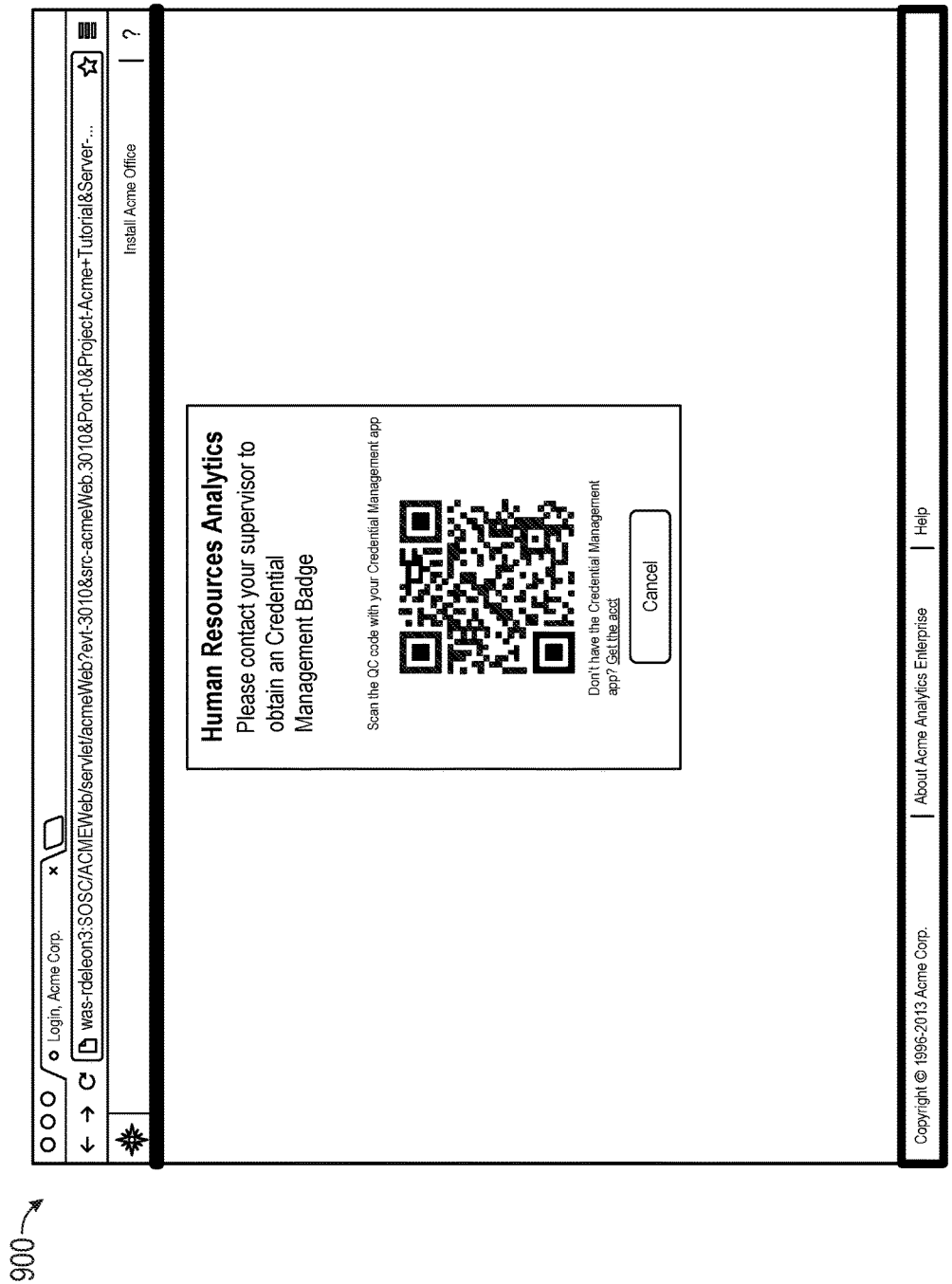
FIG. 9 is a diagram illustrating an example user interface for authenticating a user who is accessing a system through a web interface.

FIG. 9 is a diagram illustrating an example user interface 900 for authenticating a user who is accessing a system through a web interface. The user interface 900 includes a QR code for the user to scan on the user's device.

Figure 10:
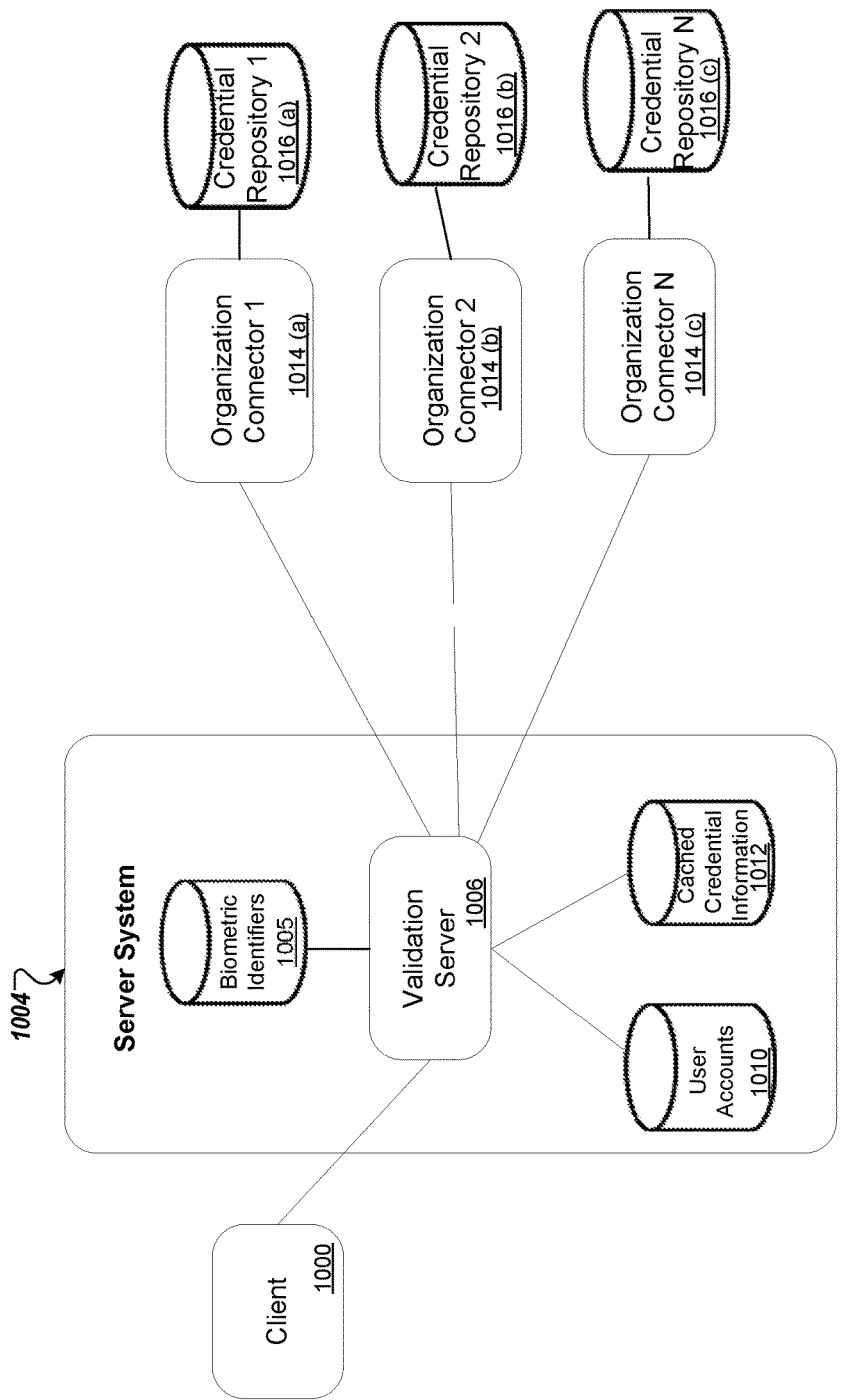
FIG. 10 is a block diagram illustrating an example of a credential managing system.

FIG. 10 illustrates an example of a credential management system. As illustrated in FIG. 10, the system includes a client device 1000 and a server system 1004. The client device 1000 operates a mobile device-based credential management client application. The client device 1000 may include any electronic device that is capable of communicating with the server system 1004 including, but not limited to, a mobile phone, smart phone, personal digital assistant (PDA), electronic book (e-book) reader, tablet computer, laptop, or other device that includes one or more processors and non-transitory computer readable storage media. The credential management client application is in communication with the server system 1004. The credential management client application acts as a platform for managing credentials issued to multiple, different users by various credential granting authorities.

The server system 1004 includes a validation server 1006, an account data store 1010, a credential data store 1012, and biometric identifiers 1005. The validation server 1006 is involved in the process of validating credential granting authorities as well as validation of credentials and/or keys. The validation server 1006 authenticates credential granting authorities that would like to make credentials available to users of the credential management system. The validation server 1006 also validates credentials and/or keys held by users of the credential management system through communication with credential management client applications operated on user devices. For example, the validation server 1006 can authenticate a user by comparing the biometric identifiers 1005 to a biometric identifier received by a user through the client 1000.

The user account data store 1010 stores user account information, and the credential data store 1012 stores credential information associated with user accounts. Users of the credential management client application may set up a user account that allows the user to store personal information as well as the credentials issued to the user. Each user account may include identification information for the user and credential data that defines credentials held by the user. The system 1004 may maintain accounts for multiple different users with each user account being specific to a user and the credentials held by the specific user.

Credentials (or information related to credentials) issued to a user by a credential granting authority may be cached in the credential data store 1012 until a cache expiration date associated with the credential passes. The cache expiration date defines the date that a cached version of the credential may be used without having to communicate with the credential granting authority to confirm the continued validity of the credential. When the cache until date has not passed, the server system 1004 may access, from electronic storage at the server system 1004, a cached version of the credential and use the cached version of the credential to send credential information (e.g., send a user an updated list of the user's credentials) or validate the credential (e.g., confirm to another user that the user's credential is valid). When the cache until date has passed, the server system 1004 communicates with the credential granting authority that issued the credential to receive updated credential information for the credential and then sends credential information or validates the credential based on the updated credential information. For example, an employer may define a cache until date of twenty-four hours for an employee credential issued to an employee by the employer. In this example, if the server system 1004 has received information for the employee credential from the employer's system less than twenty-four hours prior to the employee's attempted use of the credential (e.g., presentation of the credential to gain access to the employer's building), the server system 1004 may validate the use of the employee credential without having to communicate with the employer's system. If not, the server system 1004 communicates with the employer's system to receive updated credential information for the employee credential and validates the use of the employee credential based on the updated credential information for the employee credential.

Credentials also may be associated with an expiration date. When a credential is associated with an expiration date, credential information for the credential may be stored by the server system 1004 until the expiration date. For instance, when the server system 1004 determines that the expiration date of a credential has passed, the server system 1004 may delete the data defining the expired credential and remove the expired credential from the user's account.

The validation server 1006 is in communication with the account data store 1010 and the credential data store 1012, for example, to manage and validate credentials. The validation server 1006 authenticates and establishes connectors 1014(*a*)-1014(*c*) with various trusted credential granting authorities 1016(*a*)-1016(*c*) as shown in FIG. 10. A connector 1014 may include communication information that the server system 1004 uses to communicate with a credential granting authority 1016. For instance, the communication information may include an electronic address (e.g., a uniform resource locator (URL)) that the server system 1004 uses to communicate with the credential granting authority 1016 and a set of guidelines that govern a format for exchanging communications between the credential granting authority 1014 and the server system 1004. The credential granting authority 1014 programs its system to follow the set of guidelines stipulated by the server system 1004 to enable the two platforms to communicate credential information successfully. The set of guidelines stipulated by the server system 1004 may be published to allow software developers and/or information technology staff to configure the systems at the credential granting authorities 1016 to comply with the set guidelines. A connector 1014 may be established between the system of a credential granting authority 1016 and the server system 1004 when the server system 1004 stores the communication information and the system of the credential granting authority 1016 has been configured to communicate in accordance with the set of guidelines. In some implementations, the communication information defining the connector 1016 may include communication information that enables the credential granting authority 1014 to communicate with the server system 1004 through an Application Programming Interface (API) of the server system 1004. The server system 1004 may store unique communication information for each credential granting authority 1016 and, thus, establish a unique connector 1014 with each credential granting authority 1016. For the sake of brevity, the term connector 1014 is used throughout this disclosure to refer to communication information used in exchanging communications with a credential granting authority and does not necessarily connote a physical connection between the server system 1004 and a system of the credential granting authority 1016, although a physical connection may be used in some implementations.

As shown in FIG. 10, the validation server 1006 has established multiple, different connectors 1014 (*a*)-(*c*) for multiple, different credential granting authorities. The credential granting authorities may include one or more universities, one or more companies, and one or more government agencies, among other credential granting authorities. Each credential granting authority maintains a credential repository (e.g., credential repositories 1016 (*a*)-(*c*)) on a system operated by the credential granting authority. The systems operated by the credential granting authorities use the connectors 1014 (*a*)-(*c*) to communicate credential information from the credential repositories 1016 (*a*)-(*c*) to the validation server 1006. For instance, the client device 1000 may wish to display a credential from the credential granting authority associated with the connector 1014 (*a*). The validation server 1006 first identified the organization as authentic and established the connector 1014 (*a*) between the server system 1004 and the credential granting authority. Using the connector 1014 (*a*), the validation server 1006 sends a request to the credential granting authority for credential information of a user of the client device 1000. The credential granting authority accesses data from the credential repository 1016 (*a*) and uses the connector 1014 (*a*) to provide credential information from the accessed data to the validation server 1006, which, in turn, provides credential information to the client device 1000 for display through the credential management client application. In some implementations, a credential granting authority may provide several types of credentials to a user such that the user's account includes multiple, different credentials issued by the credential granting authority to the user. Additionally or alternatively, a user may receive credentials from several different credential granting authorities such that the user's account includes, at least a first credential issued by a first organization and a second credential issued by a second organization. The credential management system may maintain accounts for many different users, and may manage credentials issued to these users by many different organizations.

Some organizations may use biometric identifiers to authenticate a user. In order to use a biometric identifier to authenticate a user, the server 1004 collects the biometric identifier from the client 1000 and stores the biometric identifier. For example, Organization 1 may indicate to the server 1004 that Organization 1 will allow authentication using biometric identifiers. To collect a biometric identifier, a user may provide biometric information, such as a voice print or finger print, to the server 1004 through the client 1000. In the case of the voice print, the server 1004 may display a text string on the client 1000 for the user to read. The server 1004 receives the biometric identifier and stores it in biometric identifiers 1005 in connection with Organization 1.

The server 1004 may use the biometric identifier to authenticate the user. The server 1004 may authenticate the user before allowing the user to log into the credential management client application and/or before the user accesses a key or resource associated with a credential. For example, the server 1004 may receive notification that a user is attempting to log into the credential management client application through client 1000. The user may select the option of logging into the credential management client application using the Organization 1 credential. Having previously set up a biometric identifier with Organization 1, the server 1004 will prompt the client 1000 for the biometric identifier to authenticate the user. The server 1004 will receive the biometric identifier from the client 1000 and compare the biometric identifier to the saved biometric identifier saved in connection with Organization 1. If the server 1004 determines that the biometric identifiers match, then the server 1004 grants logs the user into the credential management client application.

The server 1004 may also use the biometric identifier to authenticate a user when the user attempts to access a resource associated with a credential if requested by the credential granting authority. For example, the user may attempt to use a key associated with Organization 1's credential to open a door. The server 1004 receives notification from the client 1000 that the user is attempting to use the key. The server 1004 determined that that Organization 1 has identified the key as one that requires additional authentication. As such, the server 1004 sends a request to the client 1000 to collect another biometric identifier. The server 1004 receives and compares the collected biometric identifier similarly to when the user logged into the credential management client application. If the biometric identifier matches, then the server 1004 sends a signal to access control system to unlock the door that matches the key.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any innovations or of what may be claimed, but rather as descriptions of features specific to particular embodiments of particular innovations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method comprising:
receiving, by a restricted access system and from a client device, a request for access to the restricted access system for a user;
transmitting, by the restricted access system and to a credential management system, a request to authenticate the user, wherein the credential management system maintains a credential for the user and determines that the user has not accessed the credential through a credential management application on a mobile device;
in response to the request to authenticate the user and based on the credential management system maintaining the credential for the user and determining that the user has not accessed the credential through the credential management application on the mobile device, receiving, by the restricted access system and from the credential management system, (i) challenge data, (ii) instructions to output, on a display of the client device, a representation of the challenge data, (iii) instructions to output, on the display of the client device, a request to install the credential management application on the mobile device, and (iv) instructions to output, on the display of the client device, directions to interact with the representation of the challenge data using the credential management application on the mobile device;
transmitting, by the restricted access system and to the client device, (i) the challenge data, (ii) the instructions to output, on the display of the client device, a representation of the challenge data, (iii) the instructions to output, on the display of the client device, the request to install the credential management application on the mobile device, and (iv) the instructions to output, on the display of the client device, the directions to interact with the representation of the challenge data using the credential management application on the mobile device;

receiving, by the restricted access system and from the credential management system, a token indicating that the credential management system authenticated the user based on the user interacting, through the credential management application on the mobile device, with the representation of the challenge data that was output on the display of the client device; and in response to receiving the token, opening, by the restricted access system, a session between the client device and the restricted access system.

2. The method of claim 1, comprising:

verifying, by the restricted access system, that the token is valid by providing the token to the credential management system; and receiving, by the restricted access system and from the credential management system, verification that the token is valid.

3. The method of claim 1, wherein the challenge data is a QR code that the user scans with the mobile device while the mobile device is executing a credential management client application.

4. The method of claim 1, comprising:

receiving, by the restricted access system and from the credential management system, data indicating that the credential management system maintains the credential for the user in response to the request to authenticate the user.

5. The method of claim 1, comprising:

receiving, by the restricted access system and from the credential management system, data indicating that a particular amount of time has not elapsed after receiving the challenge data, wherein the challenge data expires after the particular amount of time.

6. The method of claim 1, comprising:

polling, by the restricted access system, the credential management system, wherein receiving the token comprises receiving, in response to the polling, the credential management system.

7. The method of claim 1, wherein the challenge data includes two or more items selected from a group consisting of a request to scan, using the mobile device, a QR code outputted on the display of the client device, a request to enter a passcode into the mobile device, and a request to scan a finger using the mobile device.

8. The method of claim 1, wherein the request for access is received from a web browser running on the client device.

9. The method of claim 1, comprising:

receiving, by the restricted access system and from the credential management system, data indicating that the user is located at a particular geographic location.

10. The method of claim 1, comprising:

receiving, by the restricted access system and from the credential management system, data indicating that a credential of the user is valid during a current time of day.

11. The method of claim 1, wherein:

the credential management system determines that the credential management application is not installed on the mobile device, and the restricted access system receives (i) the challenge data, (ii) the instructions to output, on the display of the client device, a representation of the challenge data, (iii) the instructions to output, on the display of the client device, the request to install the credential management application on the mobile device, and (iv) the instructions to output, on the display of the client device, the directions to interact with the representation of the challenge data using the credential management application on the mobile device from the credential management system based on the credential management system determining that the credential management application is not installed on the mobile device.

12. A system comprising:

one or more computers and one or more storage devices storing instructions that are operable, when executed by the one or more computers, to cause the one or more computers to perform operations comprising:

receiving, by a restricted access system and from a client device, a request for access to the restricted access system for a user;

transmitting, by the restricted access system and to a credential management system, a request to authenticate the user, wherein the credential management system maintains a credential for the user and determines that the user has not accessed the credential through a credential management application on a mobile device;

in response to the request to authenticate the user and based on the credential management system maintaining the credential for the user and determining that the user has not accessed the credential through the credential management application on the mobile device, receiving, by the restricted access system and from the credential management system, (i) challenge data, (ii) instructions to output, on a display of the client device, a representation of the challenge data, (iii) instructions to output, on the display of the client device, a request to install the credential management application on the mobile device, and (iv) instructions to output, on the display of the client device, directions to interact with the representation of the challenge data using the credential management application on the mobile device;

transmitting, by the restricted access system and to the client device, (i) the challenge data, (ii) the instructions to output, on the display of the client device, a representation of the challenge data, (iii) the instructions to output, on the display of the client device, the request to install the credential management application on the mobile device, and (iv) the instructions to output, on the display of the client device, the directions to interact with the representation of the challenge data using the credential management application on the mobile device;

receiving, by the restricted access system and from the credential management system, a token indicating that the credential management system authenticated the user based on the user interacting, through the credential management application on the mobile device, with the representation of the challenge data that was output on the display of the client device; and in response to receiving the token, opening, by the restricted access system, a session between the client device and the restricted access system.

13. The system of claim 12, wherein the operations comprise:

verifying, by the restricted access system, that the token is valid by providing the token to the credential management system; and receiving, by the restricted access system and from the credential management system, verification that the token is valid.

14. The system of claim 12, wherein the challenge data is a QR code that the user scans with the mobile device while the mobile device is executing a credential management client application.

15. The system of claim 12, wherein the operations comprise:

receiving, by the restricted access system and from the credential management system, data indicating that the credential management system maintains the credential for the user in response to the request to authenticate the user.

16. The system of claim 12, wherein the operations comprise:

receiving, by the restricted access system and from the credential management system, data indicating that a particular amount of time has not elapsed after receiving the challenge data, wherein the challenge data expires after the particular amount of time.

17. The system of claim 12, wherein the operations comprise:

polling, by the restricted access system, the credential management system, wherein receiving the token comprises receiving, in response to the polling, the credential management system.

18. The system of claim 12, wherein the challenge data includes two or more items selected from a group consisting of a request to scan, using the mobile device, a QR code outputted on the display of the client device, a request to enter a passcode into the mobile device, and a request to scan a finger using the mobile device.

19. The system of claim 12, wherein:

the credential management system determines that the credential management application is not installed on the mobile device, and the restricted access system receives (i) the challenge data, (ii) the instructions to output, on the display of the client device, a representation of the challenge data, (iii) the instructions to output, on the display of the client device, the request to install the credential management application on the mobile device, and (iv) the instructions to output, on the display of the client device, the directions to interact with the representation of the challenge data using the credential management application on the mobile device from the credential management system based on the credential management system determining that the credential management application is not installed on the mobile device.

20. A non-transitory computer-readable medium storing software comprising instructions executable by one or more computers which, upon such execution, cause the one or more computers to perform operations comprising:

receiving, by a restricted access system and from a client device, a request for access to the restricted access system for a user;

transmitting, by the restricted access system and to a credential management system, a request to authenticate the user, wherein the credential management system maintains a credential for the user and determines that the user has not accessed the credential through a credential management application on a mobile device;

in response to the request to authenticate the user and based on the credential management system maintaining the credential for the user and determining that the user has not accessed the credential through the credential management application on the mobile device, receiving, by the restricted access system and from the credential management system, (i) challenge data, (ii) instructions to output, on a display of the client device, a representation of the challenge data, (iii) instructions to output, on the display of the client device, a request to install the credential management application on the mobile device, and (iv) instructions to output, on the display of the client device, directions to interact with the representation of the challenge data using the credential management application on the mobile device;

transmitting, by the restricted access system and to the client device, (i) the challenge data, (ii) the instructions to output, on the display of the client device, a representation of the challenge data, (iii) the instructions to output, on the display of the client device, the request to install the credential management application on the mobile device, and (iv) the instructions to output, on the display of the client device, the directions to interact with the representation of the challenge data using the credential management application on the mobile device;

receiving, by the restricted access system and from the credential management system, a token indicating that the credential management system authenticated the user based on the user interacting, through the credential management application on the mobile device, with the representation of the challenge data that was output on the display of the client device; and in response to receiving the token, opening, by the restricted access system, a session between the client device and the restricted access system.

* * * * *